United States Patent [19]
Gelardi

[11] Patent Number: 5,575,387
[45] Date of Patent: Nov. 19, 1996

[54] HINGED COMPACT DISC CONTAINER

[76] Inventor: John A. Gelardi, P.O. Box 714, Kennebunkport, Me. 04046

[21] Appl. No.: 328,707

[22] Filed: Oct. 25, 1994

[51] Int. Cl.$^6$ .......................... B65D 85/57; B65D 21/02
[52] U.S. Cl. .................. 206/308.1; 206/509; 206/821; 220/23.6; 220/342; 312/111
[58] Field of Search ........................... 206/309, 312, 206/308.1, 503, 509, 821; 220/23.6, 342, 343; 312/111

[56] References Cited

U.S. PATENT DOCUMENTS

| | | | |
|---|---|---|---|
| 4,230,757 | 10/1980 | Toner | 206/456 X |
| 4,397,389 | 8/1983 | Findeisen | 220/23.6 X |
| 4,440,207 | 4/1984 | Genatempo et al. | 206/206 X |
| 4,569,438 | 2/1986 | Sheffler | 206/37 |
| 4,619,363 | 10/1986 | Wolfseder | 220/23.6 X |
| 4,651,882 | 3/1987 | Wright et al. | 206/387.15 X |
| 4,702,369 | 10/1987 | Philosophe | 206/312 |
| 4,757,896 | 7/1988 | Huko | 206/509 X |
| 4,765,469 | 8/1988 | Seifert . | |
| 4,867,306 | 9/1989 | Factor . | |
| 4,871,066 | 10/1989 | LaWall . | |
| 4,892,189 | 1/1990 | Kurimune et al. | 220/342 X |
| 5,180,058 | 1/1993 | Hu . | |
| 5,188,230 | 2/1993 | O'Brien et al. . | |
| 5,246,107 | 9/1993 | Long et al. | 206/309 |
| 5,293,992 | 3/1994 | Warner . | |
| 5,310,053 | 5/1994 | Lowry et al. | 206/310 |

FOREIGN PATENT DOCUMENTS

| | | | |
|---|---|---|---|
| 420350 | 4/1991 | European Pat. Off. . | |
| 6612391 | 3/1968 | Netherlands | 206/821 |

Primary Examiner—Bryon P. Gehman
Attorney, Agent, or Firm—James Creighton Wray

[57] ABSTRACT

A snap bar connects containers for storing and transporting multiple compact discs and other thin, flat objects. The multiple disc apparatus has multiple identical containers that are connected together by snap bars to form a stack configuration. Each container has a four-sided tray. Connected to a first end is an end cap that is hinged to the first side. A snap bar with an outward opening receiver is connected to the base of the tray. Two containers are connected by inserting the end cap of a first container into the snap bar of a second container. Tabs on the cap engage apertures in the snap bar, establishing a strong connection. The cap hinge then becomes the container hinge. Once connected the base of each container works as a cover for the underlying container. The compact discs or other flat objects can be reached by lifting the container above to the container where the object of interest is located. The multiple compact disc holders are compatible with paperboards and panels which are used to provide graphics and to hold accompanying booklets relating to the contents of the discs.

18 Claims, 6 Drawing Sheets

HINGED COMPACT DISC CONTAINER

BACKGROUND OF THE INVENTION

The present invention relates generally to storing and transporting multiple compact discs or other thin, flat objects.

Needs exist for a means of storing multiple compact discs. As sizes of compact disc collections increase, incidences of lost, misplaced or misfiled compact discs also increase. The thinness of discs and cases and the ease of misplacement of a disc or case or of not returning a disc or case to its correct position in the collection makes it difficult for an owner to recognize that a disc is missing, misplaced or misfiled at an early enough stage so as easily to recover the disc. Incidences of compact disc loss and damage could be decreased, if users were able to select discs from collections without removing containers from original positions in the collections.

The mobility of compact disc players and the use of CD Roms have led to an increase in compact disc travel. Because of this trend, there has developed a need for an apparatus that can store multiple compact discs in albums or books and avoid transporting individual jewel cases. Attachments for holding individual containers that carry discs must be strong and not susceptible to unexpected detachment during transportation. Multiple disc carriers need to be lightweight and also need to be able to carry jacket covers, information booklets, documentation, and whatever other information which would have been available to users selecting the discs at homes or offices.

For storage, reference and commercial purposes, a multiple compact disc container that can carry not only the disc but also accompanying booklets and graphic cards would be advantageous. Convenience dictates that a user have all of his choices at his fingertips. Therefore, the means for combining and bundling the individual disc containers must be compatible with existing attachments for containers, such as boards and booklets.

Needs have long existed for a means of attaching multiple compact disc storage and transportation containers that will provide ease of use and permanence of positions of containers while allowing detachment of individual container trays.

SUMMARY OF THE INVENTION

A compact disc storage method hinges trays for holding multiple compact discs in connected trays as an album or book, and can also be used to hinge trays for the storage and delivery of other flat, thin objects. The present invention is a snap bar, connected to the base of individual compact disc containers, that permits easy attachment to other identical containers, is easily transportable, easy to use and inexpensive. The snap bar design enables manufacturers and owners to bundle multiple discs into one self-contained unit in a booklet or album configuration. Housed together in one package, discs and their accompanying booklets are easy to access and catalog.

Containers are connected in a manner that will allow quick access and permit simultaneous viewing of the disc and accompanying booklets. Users benefit from a multiple disc container wherein the individual containers are attached in a manner that would allow them to hold the collection in one hand and page through the collection with the other. While it is important that the multiple disc containers do not allow for unexpected disattachment of one container from the other, the connecting means in the present invention permits disc containers to be added and removed without undue burden or delay.

The individual containers are connected securely and pivotally so that the user will have a full view of the disc and be able to remove the disc by grasping its edges. This prevents the incidence of fingerprints and scratches on the disc.

The present invention is connected to the base of a standard, prior art compact disc container, each container having a hinged engaging end cap. Connecting one container or tray to another merely requires that the end cap of one container be inserted and held by the snap bar of a complementary container. The end cap, which is hinged to one end of the tray that holds the disc, can pivot, thus permitting the two containers to be drawn closer or further apart without releasing the end cap from the snap bar. This design permits the user to conveniently page through multiple compact discs as if he is reading a book.

By connecting individual containers together using the snap bar, the original order of compact discs in one's collection is effectively retained and the incidence of misplaced discs and containers is reduced. A compact disc can be selected, viewed and removed without having to take the container out of its original position and without detaching the container from the others. The present invention is compatible with a cover having panels and pockets for storing and displaying information, thus giving the user all the information needed at his fingertips. In addition, the present invention allows the user to view each disc completely and to remove it without difficulty, thus reducing incidences of scratching and fingerprints.

When the containers are connected using the snap bars, the containers are piled in a stacked configuration. The underside of each container has a flat printed board which works as a cover for the container that underlies it. This configuration provides stability to the apparatus and prevents damage to the stored discs. By having the tray serve as both a cover and a disc holder, the cost of production, as well as the apparatus weight, is lowered. It is no longer necessary to have a separate cover for each container.

The snap bars allows multiple compact discs to be marketed and stored in a book or album format. The snap bar/end cap attachment is strong and is not likely to disassemble unexpectedly. The attachments enable the multiple disc apparatus to rest horizontally and vertically. The hinged connection of the end cap to the tray, coupled with the strong attachment of the end cap to the snap bar, allows the user to quickly and effectively page through the stack of disc holders to find a desired disc. The connected disc holders can be opened at a 180 degree angle to each other without releasing the snap bar/end cap connection. Thus selection and removal of a compact disc are facilitated. The present invention also requires the detachment of the apparatus in only one place in order to add or remove compact discs and holders.

In addition to its leaf-through or page-through design, the present invention can be equipped easily with features that aid in compact disc recognition. Boards having pockets can be connected to the base of each tray without affecting the snap bar/end cap connection. Thus, accompanying booklets and graphic panels can be incorporated into the multiple disc apparatus.

By using the snap bar, manufacturers can package compact discs in a convenient, durable and cost-effective multiple tray apparatus that is made of recycled materials. Consumers will find the present invention convenient because of its compatibility with widely used trays equipped with end caps.

These and further and other objects and features of the invention are apparent in the disclosure, which includes the above and ongoing written specification, with the claims and the drawings.

DETAILED DESCRIPTION OF THE PREFERRED EMBODIMENTS

Figures 1, 2:
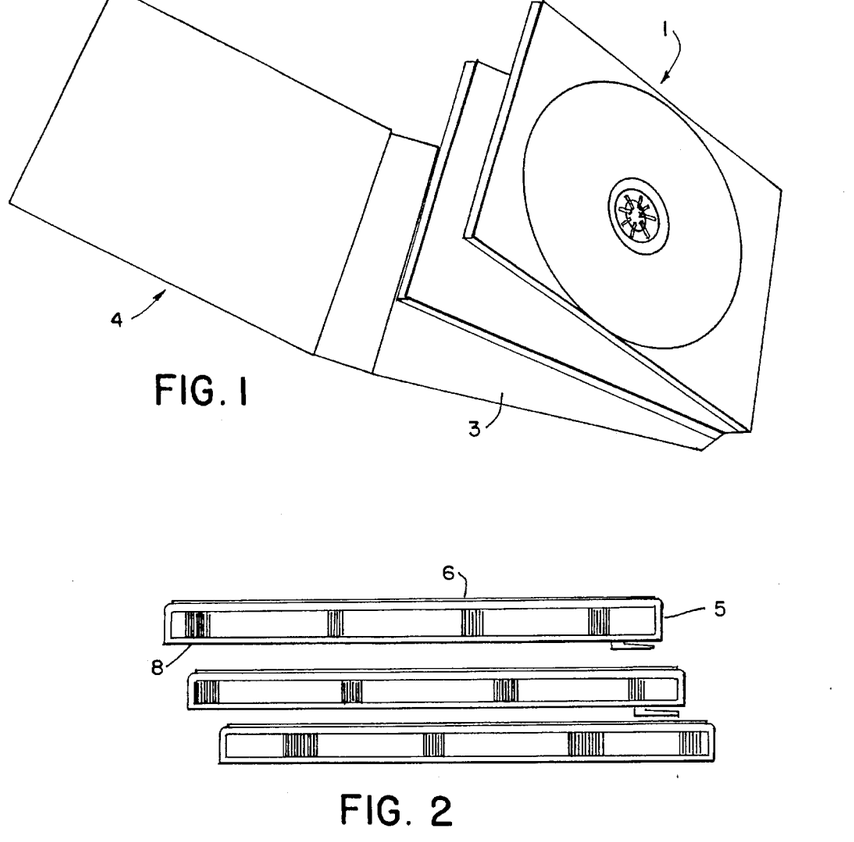
FIG. 1 is an illustration of multiple containers connected by the present invention, along with a cover.
FIG. 2 is a side view of the stacked containers showing the snap bars.

Referring to the drawings, FIG. 1 shows a multiple disc storage and transfer apparatus 1 composed of identical containers 3 connected by snap bars 39 in a multiple disc album 4.

Figure 6:
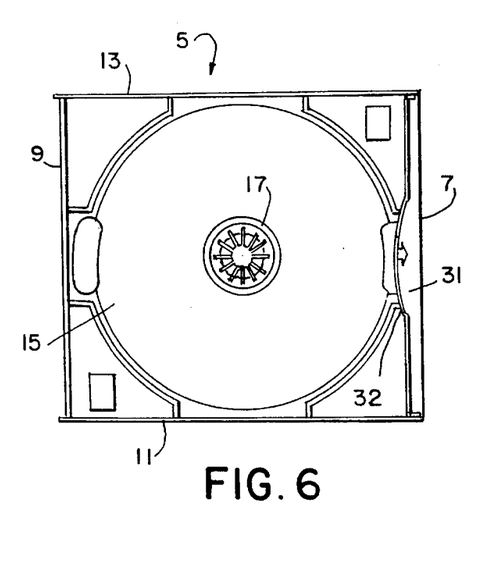
FIG. 6 is a plan view of a prior art tray.

FIG. 6 shows a prior art tray 5 that holds a compact disc or other flat, thin object. The tray 5 has a top 6, a first end 7, a base 8, a second end 9, and a pair of sidewalls 11, 13. The preferred embodiment has a rectangular shape. The top 6 of the tray 5, on which the disc rests, can have a circular recess 15 for restricting lateral movement of the disc in the container. A retaining element 17, such as a rosette, can be centrally positioned on the tray 5 to further prevent disc movement.

Connected to the first end 7 of the tray 5 is an end cap 19. FIGS. 3–7 and 15–17 best illustrate the structure of the end cap 19. The end cap 19 has a pair of opposed lateral sidewalls 21, 23. The end cap sidewalls 21, 23 rest snugly against the tray sidewalls 11, 13 when the end cap 19 is in its closed position. The tray sidewalls 11, 13 and end cap sidewalls 21, 23 can be further secured by creating a detent connection between the two pairs of sidewalls.

Figure 7:
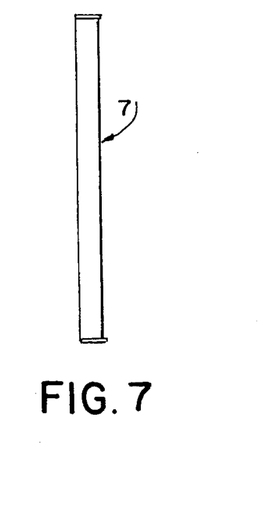
FIG. 7 is a view of the tray shown in FIG. 6 from the first end.
Figure 8:
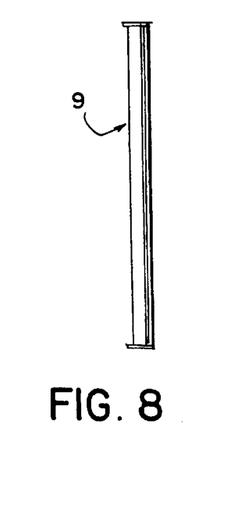
FIG. 8 is a view of the tray shown in FIG. 6 from the second end.

The two end cap sidewalls 21, 23 are connected by a connecting portion 25. In a preferred embodiment the connecting portion 25 has an L-shape configuration. The portion 25 has an end wall 27 which is connected to the first end 7 of the tray 5 with a living hinge 29. In a preferred embodiment of the invention, the end wall 27 is connected to the lower part of the first end 7 of the tray 5 with the living hinge 29. Other types of hinge attachments are acceptable, as are connections to points higher up on the first end 7. Connected perpendicularly to the end wall 27 is a lid 31. The lid 31 can have a lip 32 for facilitating the opening and closing of the end cap 19. When the end cap 19 is in a closed position, the lid 31 is parallel to the tray 5 and the end wall 27 is perpendicular to the tray 5. In an open position, the end wall 27 lies in the same parallel plane as the tray 5, and the lid 31 is perpendicular to that plane. FIGS. 5 and 15–17 demonstrate how the end cap 19 pivots. FIGS. 7 and 8 show how the end cap 19 overhangs and extends over the top 6 of the tray 5. The end panels 33 of a cover board 35 may be folded over the upper tray 5 when the containers 3 are stacked. The lid 31 may be closed over the edge of the cover 35. A graphics panel 37 may be positioned on the base 8 of each container 3.

FIGS. 2–5 show details of the present invention. Connector bars 39 secure one container 3 to another. Preferred embodiments of the connector bars 39 are snap bars 39 having a U-shaped configurations. Each snap bar 39 has an upper segment 41 and a lower segment 43. The upper segment 41 has an upper side 45, a lower side 47, an open outer end 44 and an inner end 46. The upper side 45 is attached, bonded, welded, molded or mechanically connected to the base 8 of the tray 5 near the first end 7. The lower segment 43 is connected to the inner end 46 of the upper segment 41. A preferred embodiment has a living hinge connecting the upper segment 41 and the lower segment 43. Other hinge connections may also be acceptable. The upper segment 41 and the lower segment 43, being connected in this manner, create a an outward opening receiver 49 for receiving the lid 31 of a second container's 3 end cap 19. The hinge of the end cap 19 is used as the hinged connection between the trays 5. A preferred embodiment of this snap bar 39 would have the upper segment 41 extending almost the entire length of the first end 7, and the lower segment 43 being slightly shorter than the upper segment 41.

Figure 19:
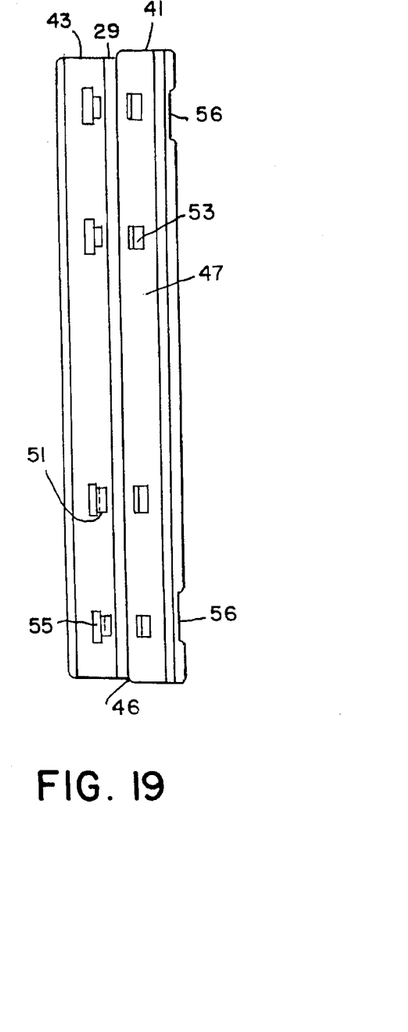
FIG. 19 is a top view of a preferred embodiment of the snap bar.
Figure 20:
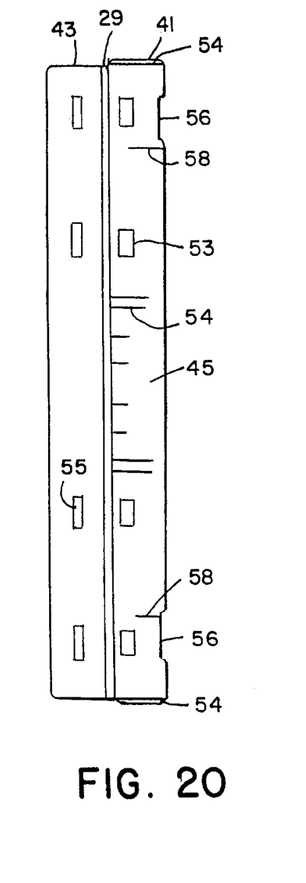
FIG. 20 is a bottom view of the preferred embodiment of a snap bar shown in FIG. 19.
Figure 21:
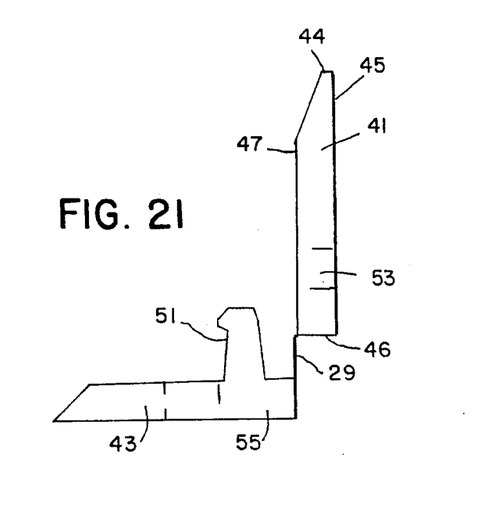
FIG. 21 is a side view of the preferred embodiment of a snap bar shown in FIG. 19.

FIGS. 19–21 show the preferred embodiment of the snap bar 39. The upper segment 41 is hinge connected 29 to the lower segment 43. The upper side 45 of the upper segment 41 has a multiple of apertures 53 that receive lugs 51 of the lower segment 43. The upper side 45 also has energy directors 54 that facilitate the alignment and attachment by welding of the snap bar 39 to a base 8 of a tray 5. The base 8 is normally waffled, and the energy directors 54, along with the cutouts 56 of the upper segment 41, allow for an easier and stronger connection of the snap bar 39 to the base 8. To further facilitate connection to the base 8 and to prevent snap bar 39 movement, L-shaped extensions 58 are positioned on the upper side 45 of the upper segment 41. The extensions 58 are perpendicular to the upper segment 41 and engage the waffled base 8 to restrict disattachment of the snap bar 39 from the base 8.

Figure 3:
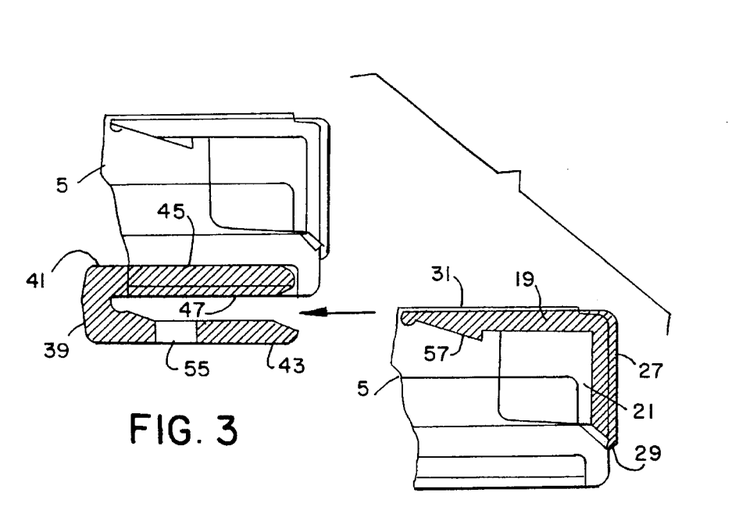
FIG. 3 is a cross-sectional detail of a snap bar and end cap that are connected to the upper and lower container trays.
Figure 4:
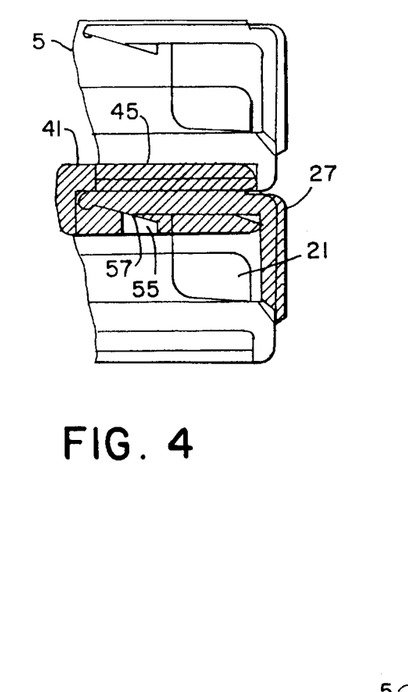
FIG. 4 is a cross-sectional detail of the coupling between the snap bar of a first container and the end cap of a second underlying container.
Figure 5:
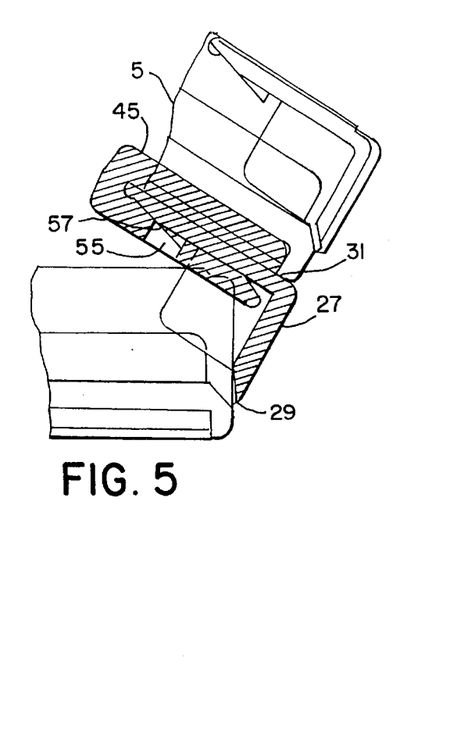
FIG. 5 is a cross-sectional detail of how the end cap acts as a hinge for connected trays.
Figure 9:
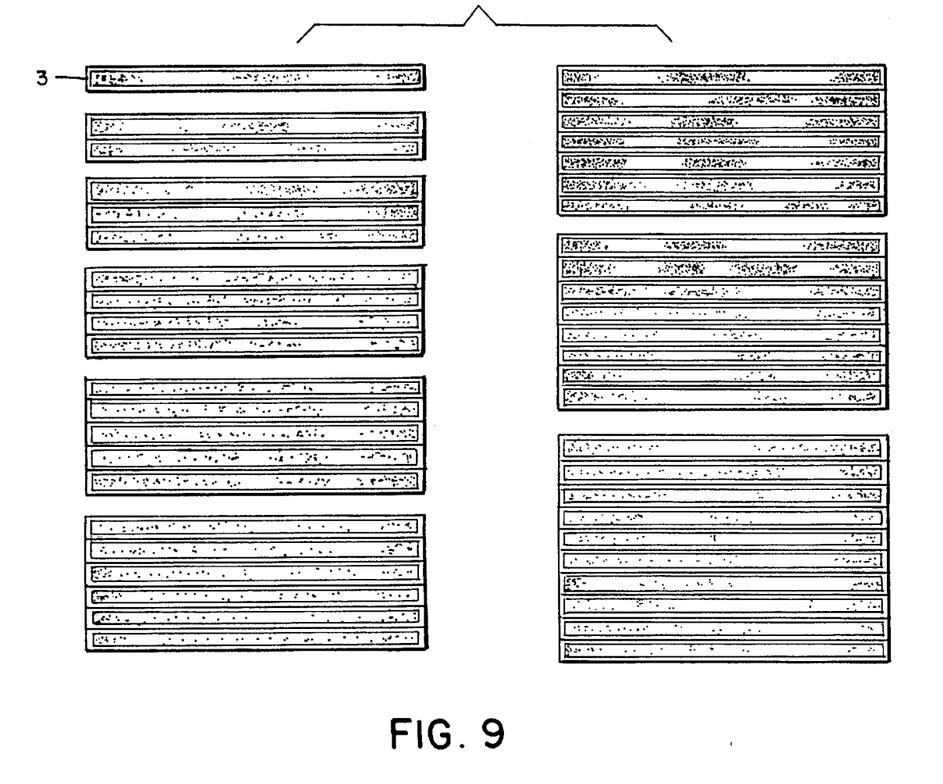
FIG. 9 shows side views of the stacked configuration of several embodiments of the apparatus.
Figure 10:
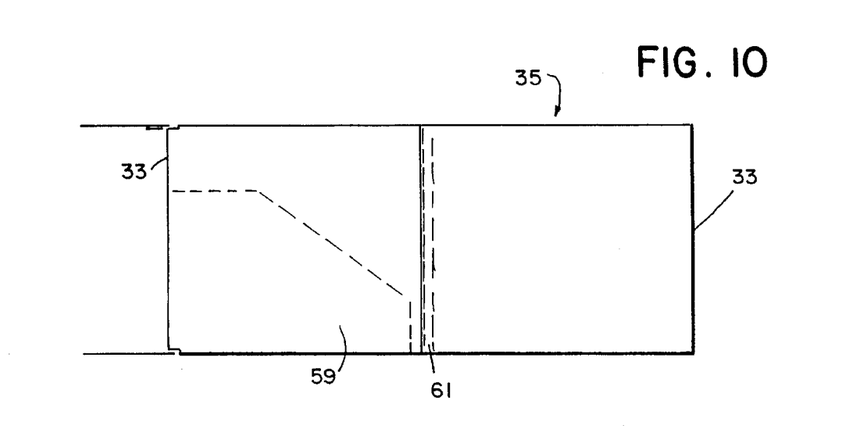
FIG. 10 is a diagram of a four panel cover or board that can be attached to the base of a bottom tray when the tray is connected by the present invention to one or more upper trays.
Figure 11:
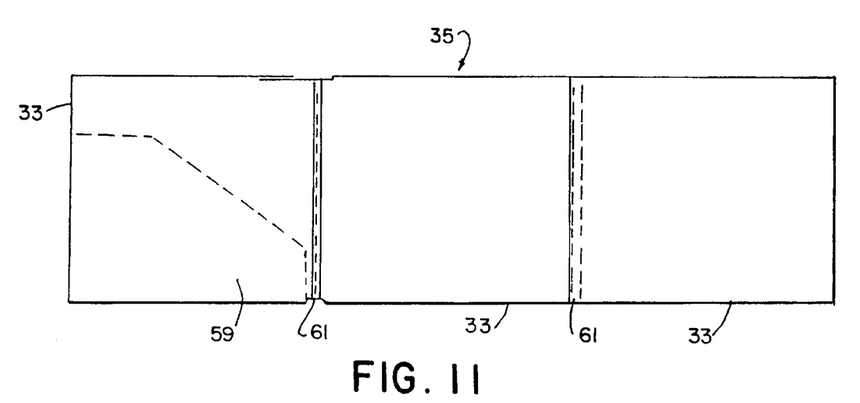
FIG. 11 is a diagram of a six panel board that can be attached to the base of a bottom tray.
Figure 12:
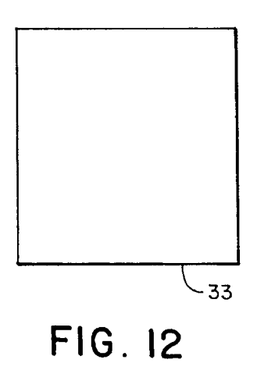
FIG. 12 is a diagram of a back card.
Figure 13:
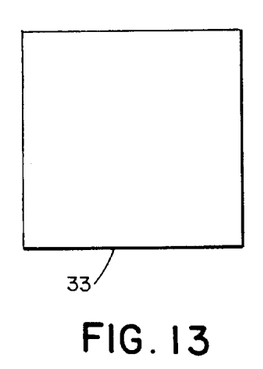
FIG. 13 is a diagram of a booklet for positioning in the sleeve.
Figure 14:
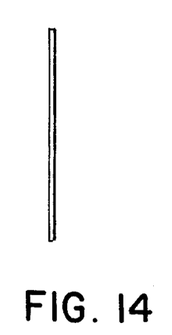
FIG. 14 is a side view of the multiple container apparatus using the present invention as an attachment.
Figure 15:
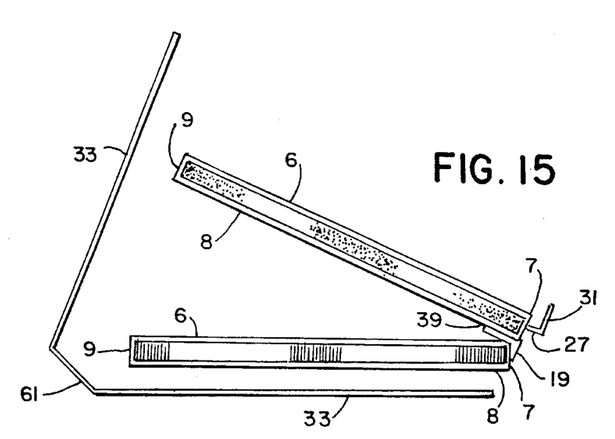
FIG. 15 is a side view of two containers connected by the present invention and having a four panel board attached.
Figure 16:
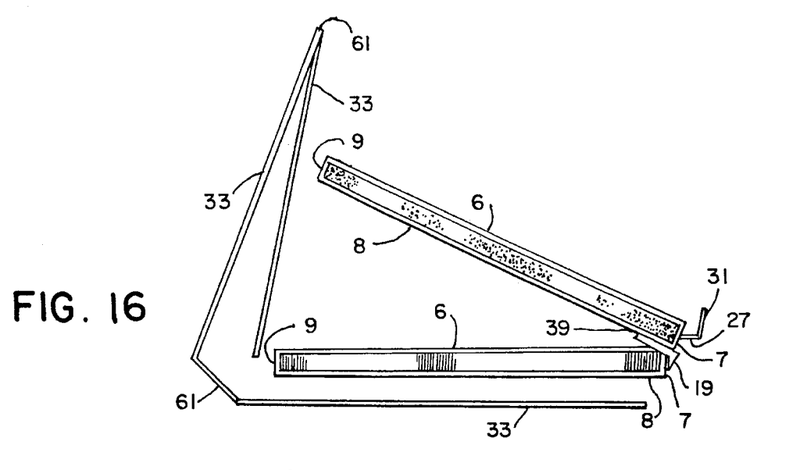
FIG. 16 is a side view of two containers connected by the present invention and having a six panel board attached.

The lower segment 43 must be tightly secured to the upper segment 41 to have a strong engagement between the snap bar 39 and the end cap 19. The preferred embodiment of the present invention achieves this means by using lugs 51 and apertures 53. One embodiment has multiple upwardly extending lugs 51 positioned on the lower segment 43 of the snap bar 39 and multiple apertures 53, corresponding in both number and position to the lugs 51 on the lower segment 43, positioned in the upper segment 41. In a similar fashion, the lugs 51 can be positioned on the upper segment 41 and the apertures 53 in the lower segment 43. Any multiple of lugs 51 and apertures 53 can be used. A preferred embodiment of the present invention uses four lugs 51 and four apertures 53. The snap bar 39 can also be manufactured by molding the upper segment 41 with the lower segment 43, rather than using a hinge connection. FIG. 9 shows the apparatus 1 using the snap bar 39 as a connector bar 39 in its stacked configuration. Each container 3 is connected to the containers below and above by connecting the end cap 19 of the container 3 below to the snap bar 39 of the container 3 above. FIGS. 3–5 show how this connection is accomplished. In a preferred embodiment, a strong engagement between the snap bar 39 and the end cap 19 is realized by using openings 55 and tabs 57. Multiple downward extending tabs 57 can be positioned on the lid 31 of the end cap 19, and multiple openings 55, corresponding in position and number to the tabs 57 of the lid 31, can be positioned in the lower segment 43 of the snap bar 39. In a similar fashion, multiple openings 55 can be positioned in the lid 31, and a corresponding number of upward extending tabs 57 can be positioned on the lower segment 43. Any number of openings 55 and tabs 57 can be used. A preferred embodiment of the invention uses four tabs 57 and four openings 55.

Figure 17:
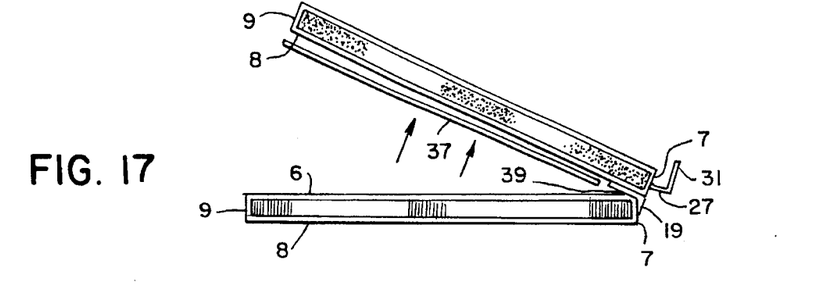
FIG. 17 is a side view of two containers connected by the present invention and having a graphic panel mounted to the base of the tray.
Figure 18:
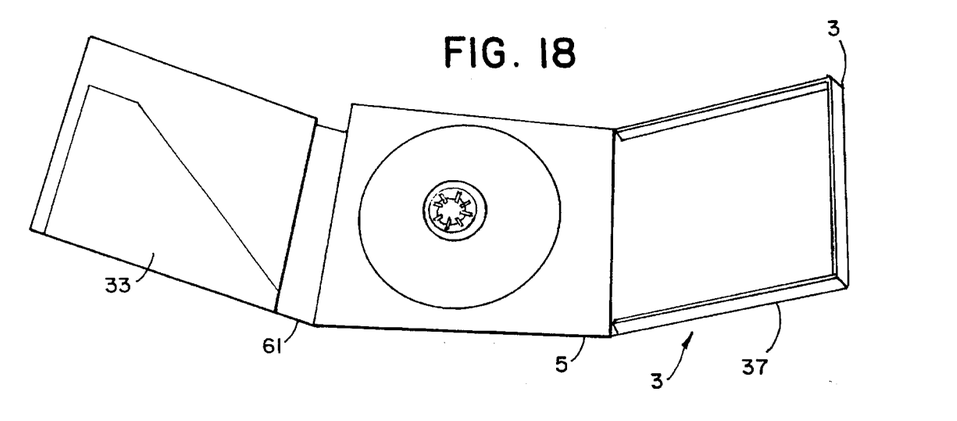
FIG. 18 is an illustration of two containers using the snap bar as an attachment means along with a four panel board and a graphic panel attached.

FIGS. 10–18 show the display boards 35 and their compatibility with the multiple disc transport and storage apparatus 1 that uses the snap bar 39. Each board 35 has either four or six panels 33, each panel 33 with an optional pocket 59. The base 8 of each tray 5 can have a panel 33 of the board 35 attached to it. FIG. 18 shows how a disc, along with all information booklets and documentation, can be viewed at one time. Bendable spines 61 between the panels 33 along with the hinged connection of the end cap 19 to the first end 7 of the tray 5 allows for all information to be displayed in the same plane. The spine 61 has a dimension equivalent to a thickness of more than one tray 5. When not in use, the panels 33 can be folded over, as in FIGS. 15 and 16, laid across the tray 5 and held in this position by the end cap 19. The panels 33 are connected by bendable spines 61. This allows for a wealth of information to be stored easily and efficiently and also permits quick accessibility. Graphic panels 37 can also be mounted on the base 8 of a tray 5, as shown in FIG. 17.

While the invention has been described with reference to specific embodiments, modifications and variations of the invention may be constructed without departing from the scope of the invention, which is defined in the following claims.

I claim:

1. A storage apparatus comprising multiple identical trays, each tray having a top, a base, a first end, a second end, lateral sidewalls, and an end cap having a movable end wall, a hinge hinging the end wall and the end cap to the first end of the tray and having a lid extending perpendicularly from the end wall for partially overlying the top, and a hinged connection for combining the multiple trays, the hinged connection further comprising a connector bar having an upper segment, a lower segment, an open outer end and an inner end, the upper segment of the connector bar being attached to the base of the tray near the first end and extending along the first end, the connector bar thus forming an outward opening receiver for receiving a lid of an end cap of an underlying tray and for using the hinge of the end cap as the hinged connection between the trays.

2. The apparatus of claim 1, wherein the upper segment of the connector bar is hinged to the lower segment at the inner end.

3. The apparatus of claim 1, wherein the upper segment of the connector bar is hinged to the lower segment at the inner end by a living hinge.

4. The apparatus of claim 3, wherein one segment of the connector bar has apertures and the other segment has lugs for snapping into the apertures near the inner end for forming the connector bar as a snap bar.

5. The apparatus of claim 1, wherein the upper segment of the connector bar is molded with the lower segment at the inner end to form a rigid, single-piece U-shaped receiver.

6. The apparatus of claim 1, wherein the upper segment and the lower segment of the connector bar are tightly secured to each other by interfitting lugs and apertures on the segments, wherein multiple lugs are positioned on the lower segment and multiple apertures, corresponding in number and position to the lugs of the lower segment, are positioned in the upper segment for receiving and gripping the lugs.

7. The apparatus of claim 1, wherein the lid and the lower segment have complementary detents for maintaining engagement of the lid in the receiver.

8. The apparatus of claim 1, wherein the upper segment and the lower segment of the connector bar are tightly secured to each other by using lugs and apertures, wherein multiple lugs are positioned on one segment and multiple apertures, corresponding in number and position to the lugs of the one segment, are positioned in the other segment.

9. The apparatus of claim 1, wherein the end cap of a first tray is secured in the receiver of a connector bar of an overlying tray by apertures and tabs, wherein the lower segment of the connector bar has multiple openings and the lid of the end cap has multiple downward extending tabs corresponding in number and position to the openings of the lower segment of the connector bar.

10. The apparatus of claim 1, wherein the upper segment of the connector bar has energy directors and multiple extensions connected perpendicularly to the upper segment for facilitating alignment and attachment by welding of the connector bar to the base of the tray.

11. The apparatus of claim 1, further comprising a board having multiple panels and a spine having a dimension equal to a thickness of multiple trays, wherein a first panel is connected to the base of a lowermost tray and the spine connects each panel to the other.

12. The apparatus of claim 1, wherein a graphic panel is connected to the base of each tray.

13. A compact disc container apparatus comprising a tray, having a top, a base having receivers, a first end, a second end and opposed lateral sidewalls, an end cap having an end wall and a hinge connecting the end wall and the first end for hinging the end cap to the first end of the tray and a lid that extends perpendicularly from the end wall for overlying a portion of the top, and a connector bar having an upper segment, a lower segment, an open outer end and an inner end, the upper segment of the connector bar being attached to the base of the tray near the first end in the receivers and extending along the first end for receiving the lid of a lower tray.

14. The apparatus of claim 13, wherein the top of the tray has a circular recess and a centrally positioned retaining element for holding a disc.

15. The apparatus of claim 13, wherein the end wall of the end cap is connected to the first end of the tray by a living hinge.

16. The apparatus of claim 13, further comprising a board having multiple panels, wherein a first panel is connected to the base of the tray and the panels are connected by a spine having a dimension equivalent to thicknesses of more than one tray.

17. A connector bar comprising an upper segment having an upper side and a lower side, a lower segment, an outer end and an inner end between the upper and lower segments, wherein the lower segment of the connector bar is molded with the upper segment at the inner end, thus creating a receiver with a U-shaped configuration, wherein the upper segment is connected the lower segment at the inner end by a living hinge, further comprising means for tightly securing the lower segment to the upper segment of the connector bar, wherein the means for securing the lower segment of the connector bar to the upper segment is by using lugs and apertures, wherein multiple lugs are positioned on the lower segment and multiple apertures, corresponding in number and position to the lugs of the lower segment, are positioned in the upper segment for receiving the lugs of the lower segment.

18. A connector bar comprising an upper segment having an upper side and a lower side, a lower segment, an outer end and an inner end between the upper and lower segments, wherein the lower segment of the connector bar is molded with the upper segment at the inner end, thus creating a receiver with a U-shaped configuration, wherein the upper segment is connected to the lower segment at the inner end by a living hinge, further comprising means for tightly securing the lower segment to the upper segment of the connector bar, wherein the means for securing the lower segment of the connector bar to the upper segment is by using lugs and apertures, wherein multiple lugs are positioned on the lower side of the upper segment and multiple apertures, corresponding in number and position to the lugs of the upper segment, are positioned in the lower segment for receiving the lugs of the upper segment.

* * * * *